(12) United States Patent
Baumela Molina et al.

(10) Patent No.: US 10,922,582 B2
(45) Date of Patent: Feb. 16, 2021

(54) LOCALIZATION OF PLANAR OBJECTS IN IMAGES BEARING REPETITIVE PATTERNS

(71) Applicant: THE GRAFFTER S.L., Pozuelo de Alarcón (ES)

(72) Inventors: Luis Baumela Molina, Logroño (ES); José Miguel Buenaposada Biencinto, Logroño (ES); Roberto Valle Fernández, Logroño (ES); Miguel Angel Orellana Sanz, Logroño (ES); Jorge Remirez Miguel, Logroño (ES)

(73) Assignee: THE GRAFFTER S.L., Pozuelo de Alarcón (ES)

( * ) Notice: Subject to any disclaimer, the term of this patent is extended or adjusted under 35 U.S.C. 154(b) by 163 days.

(21) Appl. No.: 16/304,686

(22) PCT Filed: May 30, 2016

(86) PCT No.: PCT/EP2016/062136
§ 371 (c)(1),
(2) Date: Nov. 26, 2018

(87) PCT Pub. No.: WO2017/207015
PCT Pub. Date: Dec. 7, 2017

(65) Prior Publication Data
US 2019/0213437 A1    Jul. 11, 2019

(51) Int. Cl.
*G06K 9/00* (2006.01)
*H04N 13/02* (2006.01)
*G06K 9/62* (2006.01)
*G06T 7/73* (2017.01)
*G06K 9/46* (2006.01)

(52) U.S. Cl.
CPC ......... *G06K 9/623* (2013.01); *G06K 9/00664* (2013.01); *G06K 9/4604* (2013.01); *G06K 9/4671* (2013.01); *G06K 9/6211* (2013.01); *G06T 7/74* (2017.01)

(58) Field of Classification Search
USPC ....... 382/100, 103, 106, 154, 162, 172, 173, 382/181, 190, 199, 209, 219, 220, 224, 382/254, 274, 276, 286, 291, 305, 170, 382/201, 180, 159, 195; 348/41, 46
See application file for complete search history.

(56) References Cited

U.S. PATENT DOCUMENTS 9,852,512 B2 * 12/2017 Gonzalez-Banos ........................ H04N 5/23229
2012/0301014 A1 * 11/2012 Xiao ..................... G06F 16/583
382/159

(Continued)

OTHER PUBLICATIONS

International Search Report and Written Opinion, PCT/EP2016/062136, dated Jan. 30, 2017.

(Continued)

*Primary Examiner* — Seyed H Azarian
(74) *Attorney, Agent, or Firm* — Entralta P.C.; Justin G. Sanders; Peter D. Weinstein

(57) ABSTRACT

Different aspects of the invention enable localizing planar repetitive patterns in a time and resource efficient manner by a method and device which computes a homography between the model of the planar object and the query image even in cases of high repeatability and uses multiple views of the same object in order to deal with descriptors variability when the orientation of the object changes.

17 Claims, 10 Drawing Sheets

(56) References Cited

U.S. PATENT DOCUMENTS

2013/0308861 A1* 11/2013 Cordara ............... G06K 9/6211
                                                    382/170
2016/0042251 A1*  2/2016 Cordova-Diba ..... G06K 9/4604
                                                    382/180
2016/0125261 A1*  5/2016 Balestri ................ G06K 9/6202
                                                    382/201

OTHER PUBLICATIONS

Márquez-Neila Pablo et al.: "Speeding-up homography estimation in mobile devices," Journal of Real-Time Image Processing, Springer, DE, vol. 11, No. 1, Jan. 9, 2013, pp. 141-154.

Maidi Madjid et al.: "Vision-based tracking in large image database for real-time mobile augmented reality," 2014 IEEE 16th International Workshop on Multimedia Signal Processing (MMSP), IEEE, Sep. 22, 2014, pp. 1-6.

* cited by examiner

300

  
FIG. 6A  FIG. 6B  FIG. 6C
FIG. 6

700

LOCALIZATION OF PLANAR OBJECTS IN IMAGES BEARING REPETITIVE PATTERNS

This application is a 35 U.S.C. § 371 US national stage entry of International Application number PCT/EP2016/062136, filed May 30, 2016. The contents of the aforementioned application are incorporated by reference herein.

TECHNICAL FIELD

The present invention relates generally to the field of image signal processing, and in particular, to a method and device for improved localization of planar objects in images bearing repetitive patterns.

BACKGROUND OF THE INVENTION

Signal processing techniques exist for the identification of features in images. Starting from a query, or target, image, it is possible to identify other reference images comprising features of the query image. Hence, from a database of images, it is possible to identify and extract those which match a query image. Once the match is found, the already well known characteristics of the reference image facilitate posterior processing of the query image, permitting the query image to be fully analysed and its information extracted and processed.

Such existing schemes are usually applied for the identification of certain features, such as facial features, car license plates, and similar. In some applications it is necessary to identify and extract a plane, or planar area, or a planar textured object, in an image. One such application is in augmented reality, wherein it is desirable to extract, starting from any picture or image, the main plane covering most of the image area. An example is identifying and isolating the façade of a building from an image comprising the building.

Signal processing techniques exist for the localization of planar textured objects in images. FIG. 1 depicts one such scenario, wherein the objective is, starting from a reference image of a planar object 110 (on the left) from a plurality of reference images, to automatically identify the plane on the query image 120 (on the right), which most closely resembles the plane of the reference image. Existing algorithms are based on the principle of using a series of candidate reference images which are similar to the query image, and determining the projection, between each query-candidate reference pair. This projection, or perspective transform which relates any two images of the same planar surface is also known as a homography. The homography which fulfils certain optimum criterion defines which reference image is the closest to the query image. Hence, the object plane of the reference image is selected as being the planar object being localised in the query image. This approximation works usually for simple images without complicated textures, and a small number of well distinguished objects, or planes. In the figures, the homography is depicted as a quadrilateral 130, in order to help visualise how well the location process is performed.

FIG. 2 depicts the main steps in this object localization process 200. In a first step, a repository, or database, of reference images is analysed and processed. The local features of each reference image are detected 210. Local image features are features which comprise any characteristic part of the scene that can be recognized and then localized in any other view of the same scene. Typical local image features are corners, lines, segments or high contrast regions. Typically, feature detection algorithms result in hundreds, or even thousands, of features in a given image being detected.

Next, feature descriptors of the reference image are extracted 220 from the local features. Feature descriptors describe the appearance of the feature and are computed from the image pixels around the local feature detected in the previous step. In other words, every detected feature is associated with a corresponding descriptor which in some manner represents a characteristic of that feature thereby describing some aspect of the appearance of the image. The detected features and extracted descriptors are stored together with their corresponding reference images in the reference image database. This reference image repository is continually updated with new features and descriptors of new reference images, or different views of existing reference images, or additional information relating to the reference images, such as location identification. The reference image views are obtained from the repository of reference image views by selecting those reference image views with similar object location information as the query image object location information.

In a similar fashion as performed for the reference images in the initialisation phase, in an operational phase processing is performed on the query image whose planar object is to be localised. The local features of each query image are detected 210 and the feature descriptors of the query image are extracted 220 from the local features.

Next, in a matching process 230, the query image is matched to each of the reference images in order to match its local features to those of the reference image. In other words, the features descriptors on the reference image are matched to the corresponding ones in the query image (that is, corresponding to the same scene point, line or region). This descriptor matching is carried out by comparing the portion of the reference image around a feature f (that is, the appearance of the feature) with the appearance of every single feature in the query image. This is performed by matching the extracted descriptors. The query feature with the most similar appearance is then matched with the reference feature f.

Finally, object location estimation 240 is performed as to the degree of closeness of the reference image to the query image which determines whether it is a viable candidate or not. As part of this process, a projection of the reference features on the query image results in an estimated homography 130. Although the homography is a projection of every feature of the planar object in the query image onto the reference image space, to identify the main plane of the homography as a quadrilateral visually helps to realize where the planar object in the query image 130 is located, and how well the algorithm functions. All matching inlier candidates are the ones whose query feature coordinates are located close to the projection of the matched reference feature coordinates onto the query image, computed using the estimated homography (they follow the geometric model induced by the homography). The remaining outlier matching candidates are the ones that do not agree with the model given by the homography. Such estimation can be based on a number of existing algorithms, such as RANSAC (Random Sample Consensus), MSAC (M-estimator Sample and Consensus), or PROSAC (Progressive Sample Consensus). The process is conducted iteratively for every query-reference image pair, until a termination criterion is reached, and the best candidate reference image is determined to be the closest in appearance to the query image. Likewise, the corresponding homography therefore defines the planar object location of the query image planar object.

However, these existent algorithms are not capable of localizing objects within query images when the reference image comprises texture that presents repetitive structures. One such example is depicted in FIG. 3, representing a building facade with a repetitive window pattern. Features on repetitive structures are either not matched because they are not distinctive enough or, even worst, they are matched incorrectly. Hence, due to the high degree of similarity between features and descriptors in different regions of the reference and query images, existing algorithms fail to successfully localize planar objects bearing these types of repetitive patterns. However, these existing algorithms are computationally highly intensive, as they need to produce homography estimations for an enormous amount of sets of putative correspondences in order to determine a valid solution. Hence the complexity of the descriptor matching process necessitates a lot of time and occupies a lot of resources in order to render a solution.

One popular application of planar object localization techniques is in smartphones and other low computational power devices applying mobile augmented reality, or simply being used to capture the reference or query images. The abovementioned constraints regarding excessive use of processing resources make the real-time processing of such images not viable by traditional algorithms, especially in low power computational devices, such as smart phones.

One existing proposal is based on using the gyroscope, compass or GPS devices of the smart phones as an aid in improving object localization using pure computer vision approaches. The cell-phone sensors provide a gravity vector, which aids by providing an additional metric, the orientation of the feature. The gravity vector is perpendicular to the ground plane and thus, the feature orientation over the facade of a building will be oriented along its vertical direction irrespectively of the cell-phone camera orientation. This aids in providing an orientation independent descriptor for selecting the subset of reference features acquired in approximately the same object pose. The descriptors computed with the gravity vector orientation, allow changing the cell phone's orientation and still obtain always the same descriptor (not affected by in-plane orientation changes). These gravity-rectified feature descriptors (GREFD) provide an improvement in planar objects localization over traditional approaches (that is, those purely relying on image based feature orientation estimation), however are still not capable in reliably identifying repetitive patterns in real-time processing.

Therefore a need exists to effectively solve the above-mentioned problems.

SUMMARY

It is therefore an object of the present invention to provide solutions to the above mentioned problems. In particular, it is an object of the invention to be able to efficiently localize planar objects in images, especially in images bearing repetitive patterns. Different aspects of the invention enable localizing planar repetitive patterns in a time and resource efficient manner by computing a homography between the model of the planar object and the query image even in cases of high repeatability and uses multiple views of the same object in order to cater for descriptor variability even in situations when the orientation of the object changes. Standard localization procedures are extended by using all the features even if they are on a structure that repeats all over the object.

Although different local features may be utilized, in order to facilitate the description of the invention, the local feature detected in both query and reference images is selected as being the corner of the windows of the particular façade of the example figures. It is readily understood that any other local features may also be suitable in order to identify the planar object, as long as the local feature is sufficiently repeated throughout the image.

Therefore, it is one object of the present invention to provide a method for efficiently localizing planar objects in images bearing repetitive patterns.

It is another object of the present invention to provide an apparatus for efficiently localizing planar objects in images bearing repetitive patterns.

It is another object of the present invention to provide a computer program comprising instructions, once executed on a processor, for performing the steps of a method for efficiently localizing planar objects in images bearing repetitive patterns.

It is another object of the present invention to provide a computer readable medium comprising instructions, once executed on a processor, for performing the steps of a method for efficiently localizing planar objects in images bearing repetitive patterns.

The invention provides methods and devices that implement various aspects, embodiments, and features of the invention, and are implemented by various means. The various means may comprise, for example, hardware, software, firmware, or a combination thereof, and these techniques may be implemented in any single one, or combination of, the various means.

For a hardware implementation, the various means may comprise processing units implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the various means may comprise modules (for example, procedures, functions, and so on) that perform the functions described herein. The software codes may be stored in a memory unit and executed by a processor. The memory unit may be implemented within the processor or external to the processor.

Various aspects, configurations and embodiments of the invention are described. In particular the invention provides methods, apparatus, systems, processors, program codes, computer readable media, and other apparatuses and elements that implement various aspects, configurations and features of the invention, as described below.

BRIEF DESCRIPTION OF THE DRAWING(S)

The features and advantages of the present invention will become more apparent from the detailed description set forth below when taken in conjunction with the drawings in which like reference characters identify corresponding elements in the different drawings. Corresponding elements may also be referenced using different characters.

FIG. 6 depicts three reference images as different views used to match the query image.

DETAILED DESCRIPTION OF THE INVENTION

Figure 4:
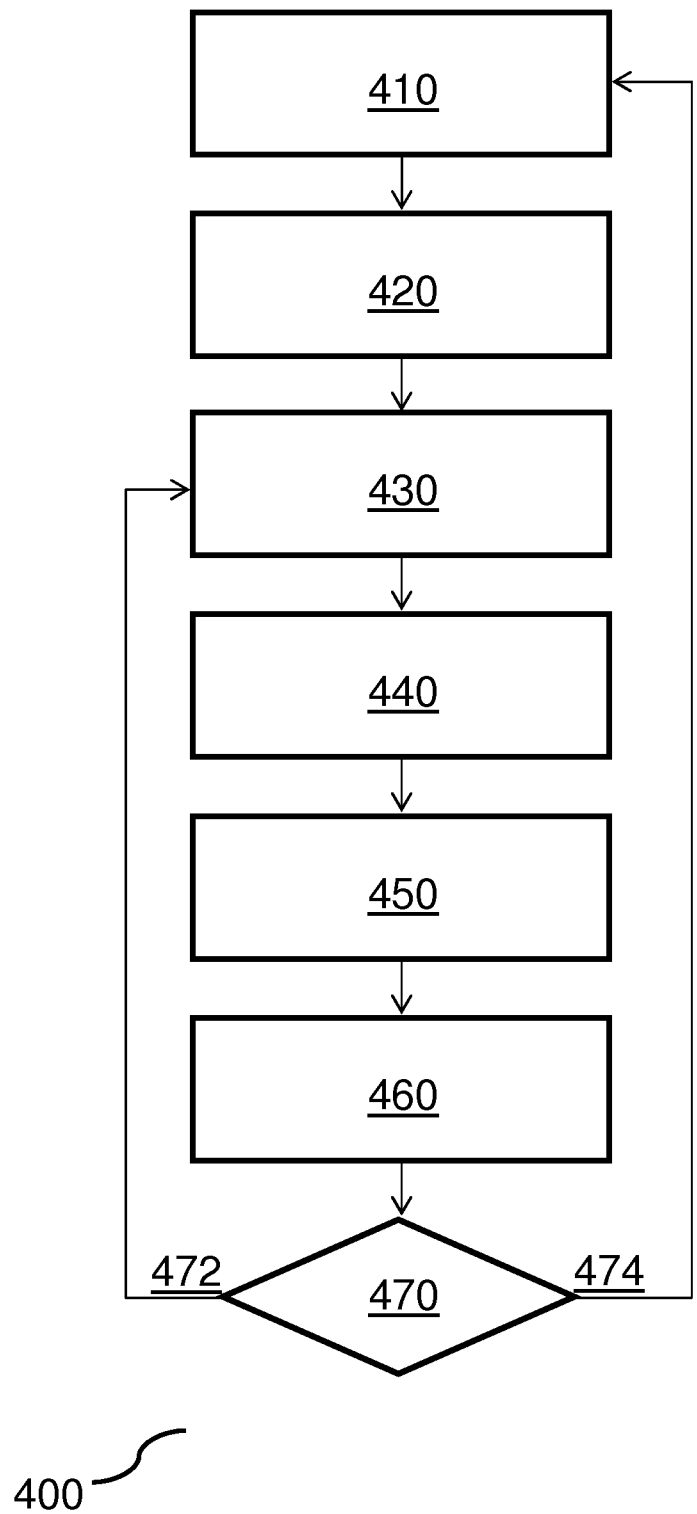
FIG. 4 depicts a method for efficiently localizing planar objects in images.

FIG. 4 depicts a method 400 for efficiently localizing planar objects in images bearing repetitive patterns according to one embodiment of the invention. In a first step, local features of the query image are detected 410, by means for detecting, and the corresponding feature descriptors extracted 420, by means for extracting. A matching 430 step, performed by means for matching, generates candidate matches from reference image descriptors to query image descriptors, from one of the reference images. The matching step computes the most similar descriptors of the query image to each descriptor in the reference image. The problem with repetitive structures is that the lowest distance descriptor is not always the correct one, mainly because there are a lot of similar descriptors in the image (i.e. the top left corner in similar windows of a façade). A subsequent step of geometric ranking 440, performed by means for ranking, ensures the most likely candidates are chosen as the correct inlier features thereby maximising the likelihood of correct image matching. Finally, the robust model estimation determines 450, by means for localising, or model estimating, the final reference image that matches with the query image and determines 460 the homography which defines the planar object location in the query image.

The geometric ranking is based on determining candidate homographies not only on a single query-reference image pair, but more importantly, a plurality of views of the same object, if available, are used. Hence, in the initialization phase, the reference image repository is populated additionally with all views of the same object (together with their corresponding local features and descriptors). Therefore, the geometric ranking optimises the planar object localization by exploiting the geometric information of the possible object orientations (or poses) as provided by the different views of the object. If the reference view v is the one with more inliers in FIG. 4, then it is the one selected together with the location of the planar object (the homography).

The planar object localization method is therefore repeated iteratively for each view of a plurality of views over the query image. Hence, it is verified 470 whether all views have been processed, and in case there are more reference image views to match 472, the method returns to step 430 for repeating the descriptor matching on the new view. Otherwise, in case all views have been processed 474, the method iterates for a new query image. At the end of the iteration, the planar object location is accurately and efficiently estimated as not only the appearance information of the images has been considered, but also the geometric information.

Returning to the beginning of the method of FIG. 4, the step of local feature detection 410 comprises obtaining a query image. This query image may be obtained from a repository of pre-stored images, for example, from a database of stored images or pictures stored in the memory of an electronic device, or from an online database of images available from a content repository over a communications network such as the Internet. The query image may also be captured by a camera, for example, a mobile phone camera, or any other electronic device.

The query image is then analysed in order to extract its characteristic features. It is preferable to use a feature extraction technique which is suitable for use in low computational power electronic devices. More importantly, the detection algorithm should be very stable in order to detect the same feature correctly using different views of the same scene. It has been determined that the most suitable feature complying with these constraints is the corner, and to identify all the corners of an object. One such feature detection algorithm for corner detection is the FAST algorithm (Features from Accelerated Segment Test), however other suitable algorithms may also be implemented.

Figure 5:
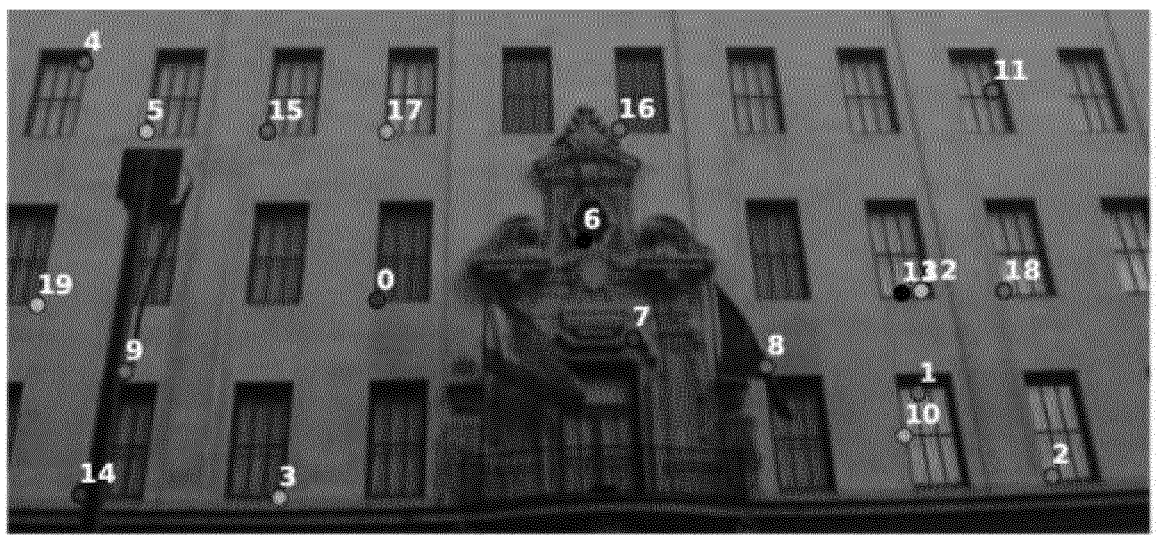
FIG. 5 depicts an example output of the feature detection step once applied to the query image.

In one aspect, it is assumed that the orientation of the detected features is 90° (that is, in the upright direction). It has been determined that this is a reasonable assumption considering that the camera vertical or horizontal axis (that is, one of the image plane axes) is always aligned with absolute vertical (such as defined by gravity). It has been found that following this assumption a constant orientation to all features is assigned in order to compute more reliable descriptors. The feature detector algorithms follow one of two alternatives: 1) do not provide the orientation or 2) compute orientation but sometimes can give different orientations to otherwise similar features. By assuming upright direction for features both are solved, 1) the case no orientation of the feature and 2) the failures in orientation estimation of similar features. FIG. 5 depicts an example output of the feature detection step once applied to the reference image, where a number of corners have been identified which correspond to the corners of the multiple windows in the image.

In the next step, the feature descriptors corresponding to each detected local feature (for example, a corner, line, segment, area) are extracted 420. One such descriptor extraction algorithm is the BRIEF (Binary Robust Independent Elementary Features) algorithm or the BRISK algorithm (Binary Robust Invariant Scalable Keypoints), however other suitable algorithms may also be implemented.

Figure 3:
FIG. 3 depicts a query image comprising texture that presents repetitive structures (for example, a building facade with a repetitive window pattern).

In an initialisation step, before performing the matching process between reference and query images, the plurality of reference images are also processed in order to detect 410 their local features and extract 420 the corresponding descriptors. This training step comprises obtaining, or otherwise generating, for each reference image, a plurality of views. Hence, each reference image represents one view from a specific angle of the same image, object, or scene. FIG. 6 depicts three reference images as different views used to match the query image of FIG. 3. FIG. 6A represents a left view, FIG. 6B represents a front view, and FIG. 6C represents a right view. Using different views results in the use of orientation independent descriptors in the matching algorithm, as well as providing accuracy in the matching process for reference images which have been taken from a wide range of angles. Further for every view a candidate homography is generated and the application of the matching process to each candidate homography results in object localization with high accuracy.

Any number of views for each reference image may be used. The minimum number of views is one. That single view should be the most commonly used one (for example, a building seen always from the left) for acquiring the query images of the object. Other views should be added when it is desired to locate the object in spite of extreme view changes from the common one. It has been found that using at least three views results in accurate object localization results.

By not using all the features in the reference image, it is possible to obtain a faster algorithm since the lower the number of features the lower the computation time. There is a tradeoff between accuracy and speed. The greater the number of features in the reference image of a given view, the more precise the estimation of the homography to the query image will be. However, the more features used, the slower is the planar object localization. By selecting the best subset of N features the best precision for given time budget can be obtained as the algorithm complexity depends on N.

Due to the repetitive nature of the texture of the planar object, traditional approaches, which aim at matching 430 only distinctive features, are not capable of correctly and accurately identifying the corresponding features in the reference image as in the query image. The inventors have realised that when, in the query image, there is more than one possible correspondence to a single reference feature, it is better to consider all of candidate features at the same time, and not discard any information.

Hence, after matching 430, all candidate descriptor correspondences are geometrically ranked 440 to ensure that the most likely candidates are chosen as the correct inlier features thereby maximising the likelihood of correct image matching. In other words, the geometric ranking is performed over the candidate, or putative, correspondences, and allows to select best correspondences in term of the most probable correct correspondences for the homography estimation performed in the following step of the algorithm. The most probable correct correspondences are used first as the ones fulfilling a threshold-based geometric distance criterion of the query descriptor candidate correspondences. The ranking is computed using a candidate homography as a prior homography. Once the correspondences are ranked, the model estimation step, comprising generating the homography of the query and reference image view, prioritize the highest ranked correspondences to localize the planar object of the query image by selecting the planar object of the reference image view based on this homography.

In an aspect where more than one reference image view is available, the process is repeated for every pair of query image and reference image view, and the final planar object is determined by determining a candidate homography for every pair (query image-reference image view) and selecting the reference image view planar object corresponding to the best candidate homography as the query image planar object location.

Figure 7:
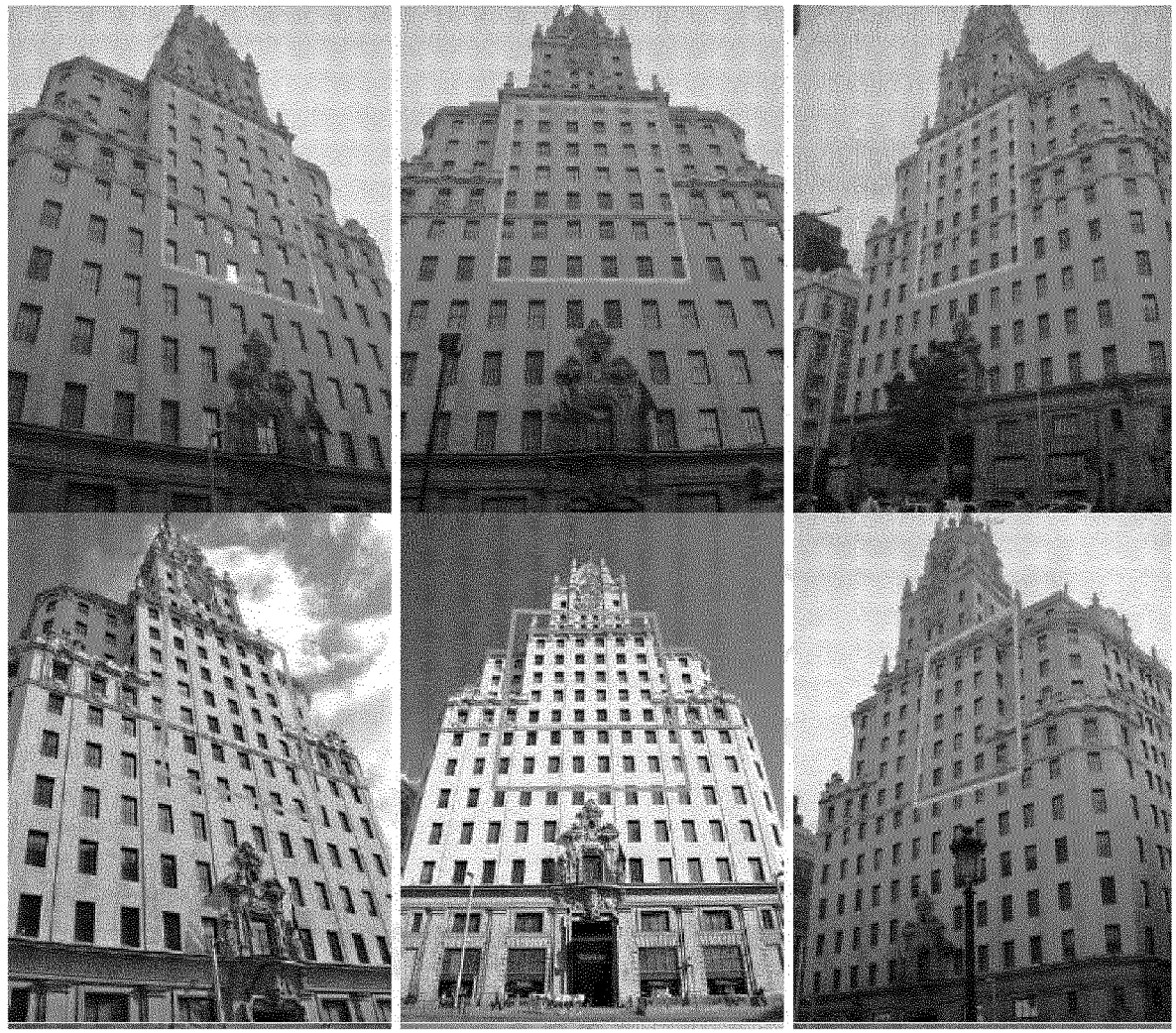
FIG. 7 depicts the transfer of the prior location of the facade of different views of a reference image to different views of a query image.

In order to generate prior homographies for each view, it is assumed that the object of the query image is initially captured almost in the same way as the object is captured in the reference image from each view. This assumption is the same as supposing a known prior for the homography $H_r$ between the reference image $I_r$ and the query image for each view $v_j$. A prior homography is defined as $$H_r = T_2 \cdot S \cdot T_1,$$ [expression 1]

where $T_2$, S and $T_1$ are given by:

$$T_1 = \begin{pmatrix} 1 & 0 & -c_x \\ 0 & 1 & -c_y \\ 0 & 0 & 1 \end{pmatrix}, S = \begin{pmatrix} s & 0 & 0 \\ 0 & s & 0 \\ 0 & 0 & 1 \end{pmatrix},$$ [expression 2]

$$T_2 = \begin{pmatrix} 1 & 0 & c_x \cdot r_w \\ 0 & 1 & c_y \cdot r_h \\ 0 & 0 & 1 \end{pmatrix}$$

where $(c_x, c_y)$ are the pixel coordinates of the object centroid in the reference image of that view, $r_w$=columns($I_q$)/columns($I_r$), $r_h$=rows($I_q$)/rows($I_r$) and $s=\min(r_w, r_h)$. Hence the prior homography $H_r$ is the identity homography modified to take into account the difference in scale and aspect ratio between the reference and the query image. FIG. 7 depicts the transformation of the four corners of a quadrilateral with the generated homographies for three different views of a query image (bottom), based on an assumption of the prior homography of the reference image views (top).

In a particular application of this processing to visual tracking of moving objects, such as a plurality of images in a video sequence, once the homography between the correct reference image and the first query image in the video has been estimated, instead of using the identity prior mentioned, the prior homography obtained from this video estimation is used as the prior for the next image in the video sequence. This saves processing as there is no need to perform the scale and aspect ratio processing mentioned and what is more important, the homography estimation with all the reference image views.

These query image homographies are then used to generate a geometric ranking of the candidate query descriptors to the homographies according to a geometric weighting. A geometric weight is defined as:

$$w_{q,f} = \exp\left(-0.5 \cdot \frac{\|x_q - H_r x_f\|^2}{b^2}\right)$$ [expression 3]

where f represents a reference feature and q one of its putative feature correspondences in the query image, $x_f$ represents the pixel coordinates of feature f on the reference image and $x_q$ the position of feature q on query image, and $x'_f$ represents the projection of $x_f$ in the query image using the homography for that view $H_r$. The geometric weight is applied to each f-q match according to the Euclidean distance of $x_q$ to $x'_f$. $w_{q,f}$ is assumed proportional to the Gaussian probability density function with mean $x'_f$ and standard deviation b. With this definition, the greater the distance of $x_q$ to $x'_f$ the lower is the probability of being correct for the putative match f-q.

The factor b represents the standard deviation of the geometric error in the putative correspondences and is user-definable. For good homography estimations, a lower value of b suffices, however if it is not certain how good a homography estimation is, the value of b is increased. The b value modulates the distance to $x'_f$ from which the weight $w_{q,f}$ is going to 0. A putative match f-q with $w_{q,f}=0$ means, in practice, that it is removed from the list of candidate matches. Hence poor candidate matches to feature f are filtered out resulting in a more efficient process for estimating the optimum homography.

Once all the geometric weights, $w_{q,f}$ for every reference feature f are determined, they are normalised and summed-to-1 to obtain a global geometric weight $\hat{w}_{q,f}$ for that reference-query image pair. A final score is determined after geometric weights normalization for each of the putative correspondences:

$$s_{q,f} = \hat{w}_{q,f} \cdot \frac{1}{N \cdot n_f} \qquad \text{[expression 4]}$$

where N is the total number of reference features in the model and $n_f$ is the number of correspondences that matched with reference feature f. In this case the scores are also normalised summed-to-1 obtaining $\hat{s}_{q,f}$. The $s_{q,f}$ values are computed from the geometric ranked weights and $s_{q,f}$ weights up the putative correspondences of reference feature f with lower number of putative correspondences ($n_f$).

Once the geometric ranking 440 ensures that the most likely candidates are chosen as the correct inlier features, these are used in a robust model estimation algorithm 450, to determine the most likely reference image matching the query image. A homography model is represented by a 3×3 matrix with 8 degrees of freedom or unknowns. Each putative correspondence gives 2 equations and therefore we need at least 4 inlier correspondences, a minimal set, to compute the homography matrix. The input to the estimation algorithm are all the candidate correspondences and the weights, $\hat{s}_{q,f}$, that represent the probability of being inlier for each correspondence. The robust model estimation algorithm is based on random sampling that on each iteration: 1) selects, based on the weights, a random minimal set of correspondences, 2) computes the homography, 3) transforms the reference feature coordinates of all putative correspondences to the query image, 4) counts the number of inliers as the number of correspondences whose query feature coordinates are near the homography projection of its reference feature. The algorithm returns the homography with the biggest number of inlier correspondences together with the set of inlier correspondences to that homography.

Any robust estimation algorithm that uses weights in the putative correspondences can be used. One such estimation algorithm is the PROSAC (PROgressive SAmpling Consensus) algorithm and another one is the guided-MLESAC (guided Maximum Likelihood Estimation SAmple Consensus), however other suitable algorithms may also be used. When each reference feature is allowed to have many candidate correspondences in the query image care must be taken in the selection of each minimal set.

In one aspect, the PROSAC algorithm (PROgressive SAmple Consensus) is modified to allow 1-to-many putative matches and with correspondence weights given by $\hat{s}_{q,f}$. PROSAC takes into account the weights given to each input putative correspondence. The algorithm proceeds as any probabilistic robust model estimator selecting at random minimal sets of 4 correspondences for homography estimation. The difference with other estimators is that it selects correspondences at random but between a reduced set with only the higher weights correspondences, the most probable inliers correspondences. If we have a high probability of an incorrect model (homography) to give the same number of inliers as the best homography so far, PROSAC continues iterating. As the number of iterations executed increases PROSAC incorporates progressively correspondences with lower weights to the set used in sampling the minimal sets. However, since 1-to-many correspondences are used, PROSAC is modified to ensure that in the 4 correspondences of the minimal set the same reference feature does not appear more than once. PROSAC is also modified in order to count each reference feature candidate correspondence only once as inlier correspondence.

In another aspect, after the robust model estimation algorithm outputs the best homography and the inliers correspondence set, a local optimization procedure of the homography is performed using the inliers set. The local optimization is performed with the LO+-RANSAC (Fixed Locally Optimized—RANdom SAmpling and Consensus) algorithm but other suitable algorithms can be implemented to refine the homography estimation given by the robust model estimation algorithm.

In another aspect of the invention, the matching operation can be enhanced by performing an adaptive radius matching operation, by means for adaptive radius matching, between reference and query images by applying an adaptive radius matching operation which is optimised to take into account the full data set whilst providing a resource efficient matching operation.

The adaptive radius matching comprises ranking the extracted descriptors $D_q=\{d_1, \ldots, d_n\}$ of the query image ordered by distance (lowest distance first) to $d_f$, $d_f$ being the descriptor of the reference feature f. Without discarding information, all the most similar descriptors in $D_q$ to $d_f$ are selected as putative correspondences. A similarity threshold θ is defined in order to cutoff, from all the putative correspondences of the query descriptors $D_q$, those which are most similar to the reference descriptor $d_f$:

$$r_i = \frac{\text{distance}(d_f, d_1)}{\text{distance}(d_f, d_i)} > \frac{1}{p} = \theta, \forall i > 1 \qquad \text{[expression 5]}$$

where p is a factor ranging typically from 1 to 2. In one example, a suitable value for p is 1.15 which means that the distance to $d_f$ of the accepted descriptors should be at most a 15% bigger that the closest one. This procedure is adaptive because it finds a threshold (radius of a circle around $d_f$) in descriptors distance that adapts to (or depends on) the distance of $d_f$ to the most similar query descriptor $d_1$. All descriptors in $D_q$ whose distance to $d_f$ is lower than p times distance ($d_f$, $d_1$) are determined where $d_1$ is the closest query image descriptor to $d_f$. Therefore, all similar descriptors are used as putative correspondences to $d_f$ because, if $d_f$ represents, for example, the top left corner of a window, all the query image descriptors in the same corner of identical windows should be very near in descriptor space. The parameter r is determined based on a ratio of differences between descriptor distances of a reference descriptor to a first query descriptor and to a current query descriptor.

In general, 1-to-C correspondences are output from this operation. When the reference feature lies on a repetitive structure, C>1. When the feature is distinctive (there is no other similar in the whole scene), then C=1. With the adaptive radius matching all $d_i$ are selected as putative correspondences of $d_f$ that results in the radius test $r_i$>θ, including $d_1$. In the case of distinctive enough descriptors the adaptive radius matching only results in one correspondence being determined. This is due to the fact that when the feature is distinctive there is only one correct match. In terms of descriptors distance, it means that the only descriptor in $D_q$ that passes the adaptive radius test $r_i$>θ is $d_1$ (the nearest to $d_f$). The other descriptors are not similar to $d_f$ and then their distance is much bigger than p times distance ($d_f$, $d_1$).

The adaptive radius matching ensures that all the similar features to the query one, and only them, are chosen as putative correspondences. Consequently there is more than one correspondence in the chosen set after the matching operation. It also applies a weighting that enforces that the reference features with less correspondences are chosen with more probability. Therefore, since the most distinctive features are chosen first, the probability of selecting a minimal set with all the matches being inliers is maximised. This in turn enables exploiting all available information however without incrementing the processing time or resource consumption.

Figure 8:
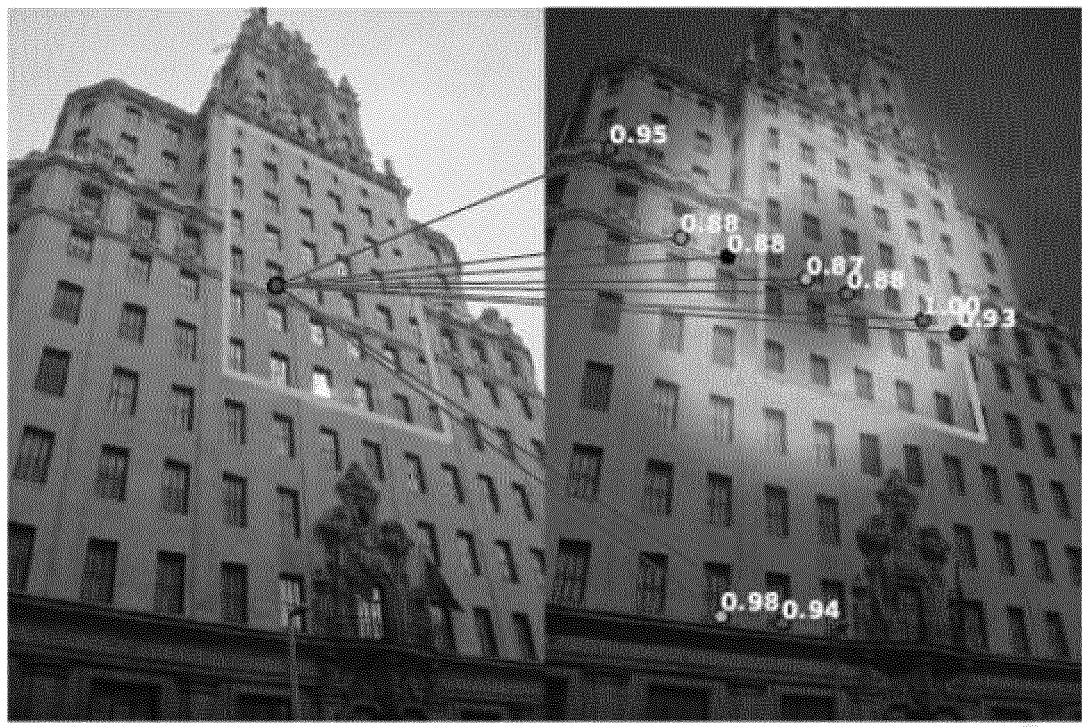
FIG. 8 depicts the result of the adaptive radius matching and the geometric ranking, with the reference image on the left and the query image on the right.

FIG. 8 depicts the adaptive radius matching selected correspondences (right image) for a single reference image feature (left image). Additionally, the geometric ranking, represented by the concentric shades, correctly identify the single candidate in the central circle which most closely resembles the original reference feature. The quadrilaterals helps to understand how the homography used in the geometric ranking maps the features from reference image (left) into query image (right).

In one aspect, the feature detection algorithm can be enhanced by applying a feature detection filter, performed by means for feature filtering, which removes those features which are not resistant to scale changes (changes in object size in image), and therefore outputs a set of features which are highly scale invariant (invariant to object size in image). The filter is applied both to the reference image views as well as the query image views. The changes in image size allows to get more (size increases) or lower (size decreases) object details. Therefore, having a lower object size in the image can be simulated by blurring the input image.

Starting from the set of pixel coordinates of the detected features $x_f$ detected on the original image, I, in a first step a repeatability score is initialized to zero for every single reference feature. Next, the original image I is convolved with a Gaussian kernel, causing a Gaussian blur, to obtain $I_b$. This is equivalent to reducing the image resolution. The step of feature detection is repeated on the blurred image $I_b$ to obtain a new set of feature coordinates $x_k$. A maximum distance is defined in order to declare the corresponding features of the original and blurred images as the same feature. If the distance $d_f$ of the feature f is larger than the maximum distance threshold, it is concluded that the feature f cannot be reliably found in the blurred image at the current scale. On the other hand, in case the distance $d_f$ of the feature f is smaller or equal to the maximum distance threshold, it is concluded that the feature f can be reliably found in the blurred image at the current scale and its repeatability score is incremented by one.

The process is iteratively repeated for different scales, each subsequent iteration starting with the blurred image as the starting image, that is, $I=I_b$. However, in each subsequent iteration, the Gaussian kernel size is increased by two. Once the processing has been performed for all required scales, all features with a repeatability score of zero are removed. Hence only those features remain which are invariant to scale and robust to scale changes. The feature detection filter may be implemented, for example, in the embodiment of FIG. 4, after the local features of the reference image are detected 410 and before the corresponding feature descriptors extracted 420. Once descriptor extraction is applied to features resulting from this feature detection filter, the resulting feature descriptors and scale invariant as well.

In another aspect of the invention, the feature descriptor extraction algorithm can be enhanced by applying a descriptor extraction filter, performed by means for feature descriptor sorting, which sorts the descriptors in terms of their geometric repeatability. In other words, the descriptors which are easier to find and match are ranked first, and hence they are those features which are most easily identified in different query images of the same view.

For this purpose, instead of using a single reference image per view, a plurality of additional training images in the same view are used. The true homographies between the reference image and each of these additional training images should be also known in advance. A geometric repeatability score is defined as the number of reference images in which f can be found by matching its descriptor. Starting from a set of descriptors extracted from a set of local features, a geometric repeatability score is initialized to zero for every single reference feature. For each reference feature f, at coordinates $x_f$, the most similar training feature is identified by computing distances between descriptors of the feature and the first training image. If the feature f is the most similar in appearance and is an inlier feature of the true homography H, the repeatability score for that feature is incremented by 1, otherwise it remains at zero. The process is iteratively repeated for all the training images. Once all images have been processed, the reference features are sorted in decreasing order of repeatability.

The descriptor extraction filter may be implemented, for example, in the embodiment of FIG. 4, after the feature descriptors are extracted 420 and before the training step 430. Once descriptor extraction is applied to features resulting from this feature detection filter, the resulting feature with highest repeatability identify the most easily detectable ones, and therefore further enhance the localization method. The use of different training images for the same view can avoid the selection of reference features over occluding objects in the reference image given that in most of the training images that occluding object is not present. For example, if in one reference image there is a truck in front of a façade and another training image does not have the truck, then features on the truck will not have a high repeatability score, and hence are not selected by this filtering step.

In a further aspect the feature detection filter as well as the descriptor extraction filter may be implemented in the process flow of FIG. 4. In such case, the output of both filters is a subset of the reference features which are the most scale resistant ones, and at the same time are the most distinctive ones in the sense of being able to find them with ease in different training images of the same view.

Figure 9:
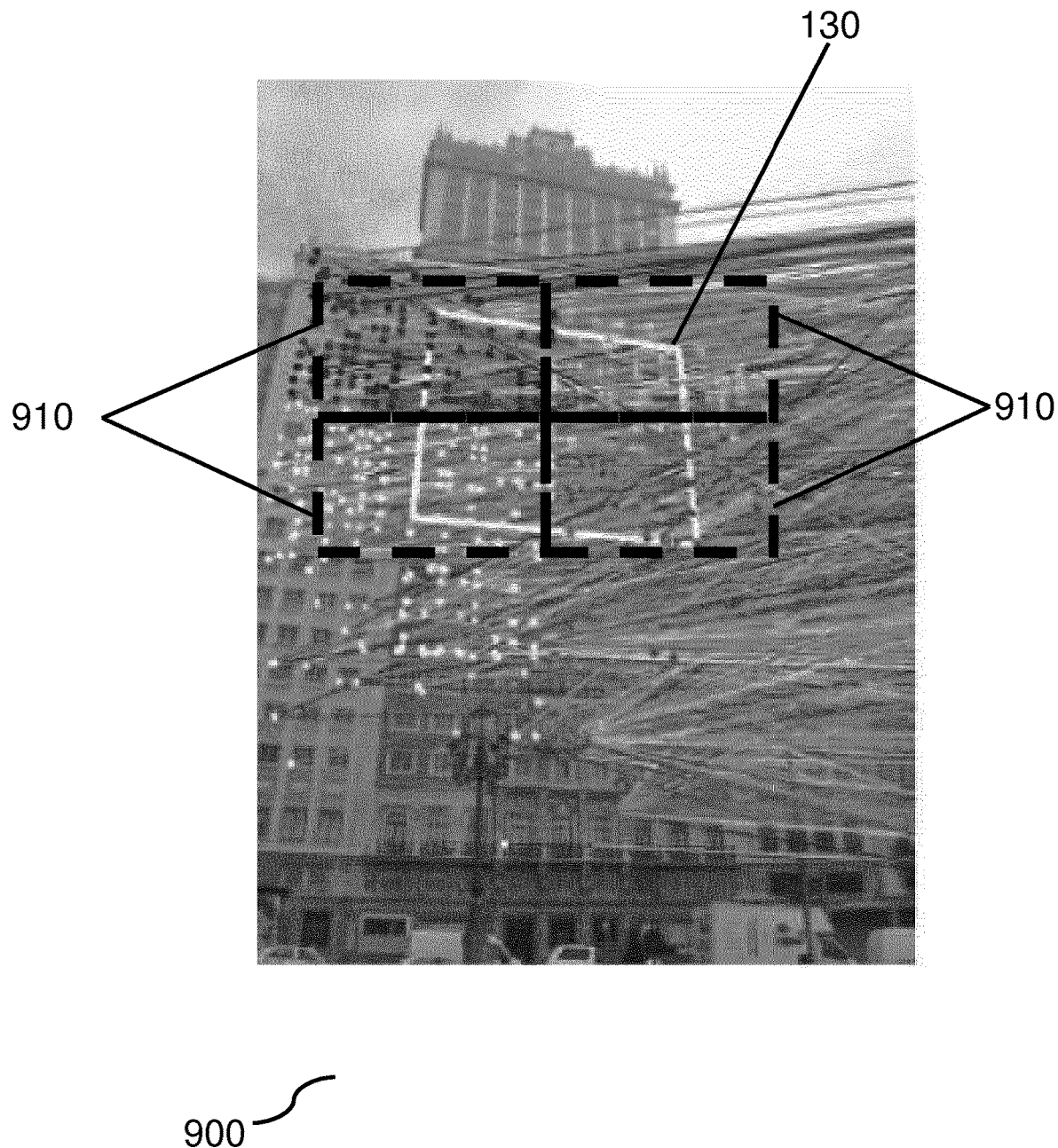
FIG. 9 depicts the spreading of the features all over the reference image by dividing the image in four regions.

However, in some circumstances it is possible that the detected features are all grouped in a tiny part of the planar object of the reference image, which would result in incorrect homography estimation. Hence, in one aspect, the features are spread all over the planar structure, as depicted in FIG. 9. In other words, the best reference points are spread all over the reference image by dividing the image in at least four regions 910 and selecting an equivalent number of features in each of the four regions. The regions are defined around each of the corners that define the area of interest 130 of the object in the reference image. The more regions there are, the more spread the features will be. It has been found that a minimum of four regions provides a good spread of features. This feature spreading may be implemented, for example, in the embodiment of FIG. 4, after the features are detected 410 and before the descriptors extraction step 420. As mentioned, this ensures the uniform spreading of putative correspondences with the input query image, and increases the likelihood of correct matching. It also allows having better estimations in the case of partial occlusions of the object as, with good spread of features, is easier to have most of the query features not occluded and obtain the correct matches for most of the reference features.

Additionally, in such circumstance, when applying the geometric ranking 440 of the embodiment of FIG. 4, the putative correspondences of each of the $R_i$ regions 910 are sorted from highest to lowest normalized score, $\hat{s}_{q,f}$, where the reference feature f is in the $R_i$ region. A global list of putative correspondences, $P_c$, is generated by merging the sorted lists of the four regions by selecting the highest score correspondence first from each of the $R_i$ regions in turn. Hence, the final steps of image determination 450 and final homography determination 460 processes a list of correspondences sorted by geometric normalized score and spread over the $R_i$ regions, producing even more accurate results in a resource efficient manner.

Figure 10:
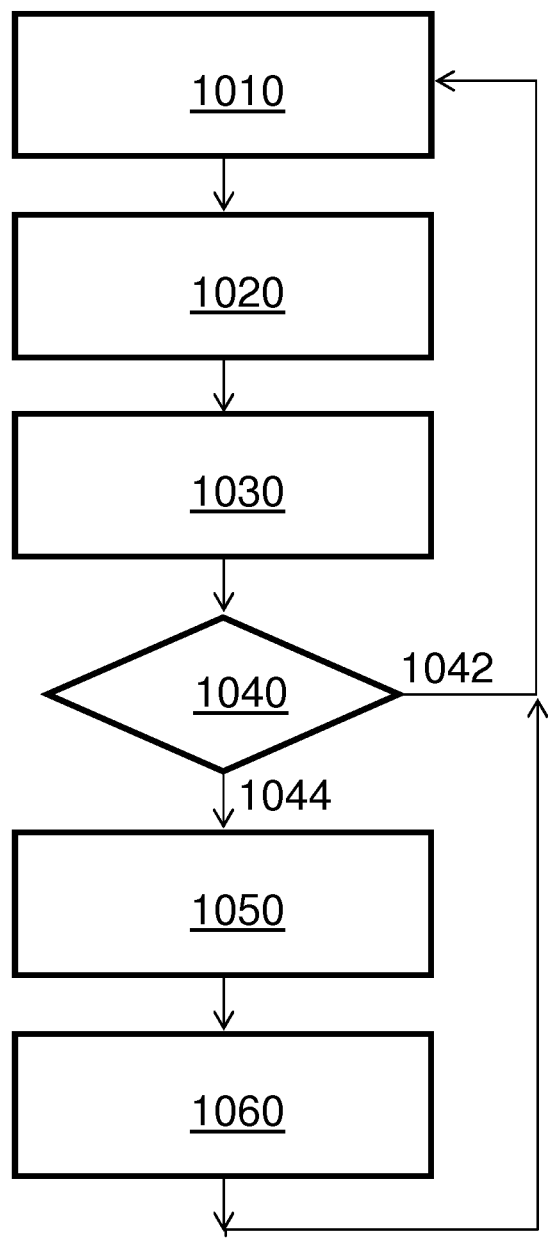
FIG. 10 depicts an aspect of the initialization step comprising the combination of feature detection filtering, descriptor extraction filtering and feature spreading.

FIG. 10 depicts an aspect of the initialization step comprising the combination 1000 of feature detection filtering, descriptor extraction filtering and feature spreading. The process starts by detecting 1010 the local features, which are then filtered by applying the feature detection filtering 1020 as described based on multiscale repeatability. The detected and filtered features are then used to extract 1030 the feature descriptors, the extracting comprising applying the descriptor filtering as described. It is then determined 1040 whether all training and reference images have been processed, and in case negative, the process returns 1042 to the initial step of repeating feature detection, filtering, and descriptor extraction on all remaining training and reference images. On the other hand, in case all images have already been processed 1044, the reference features with highest repeatability are selected 1050 and they are spread 1060 around the reference image.

Figure 1:
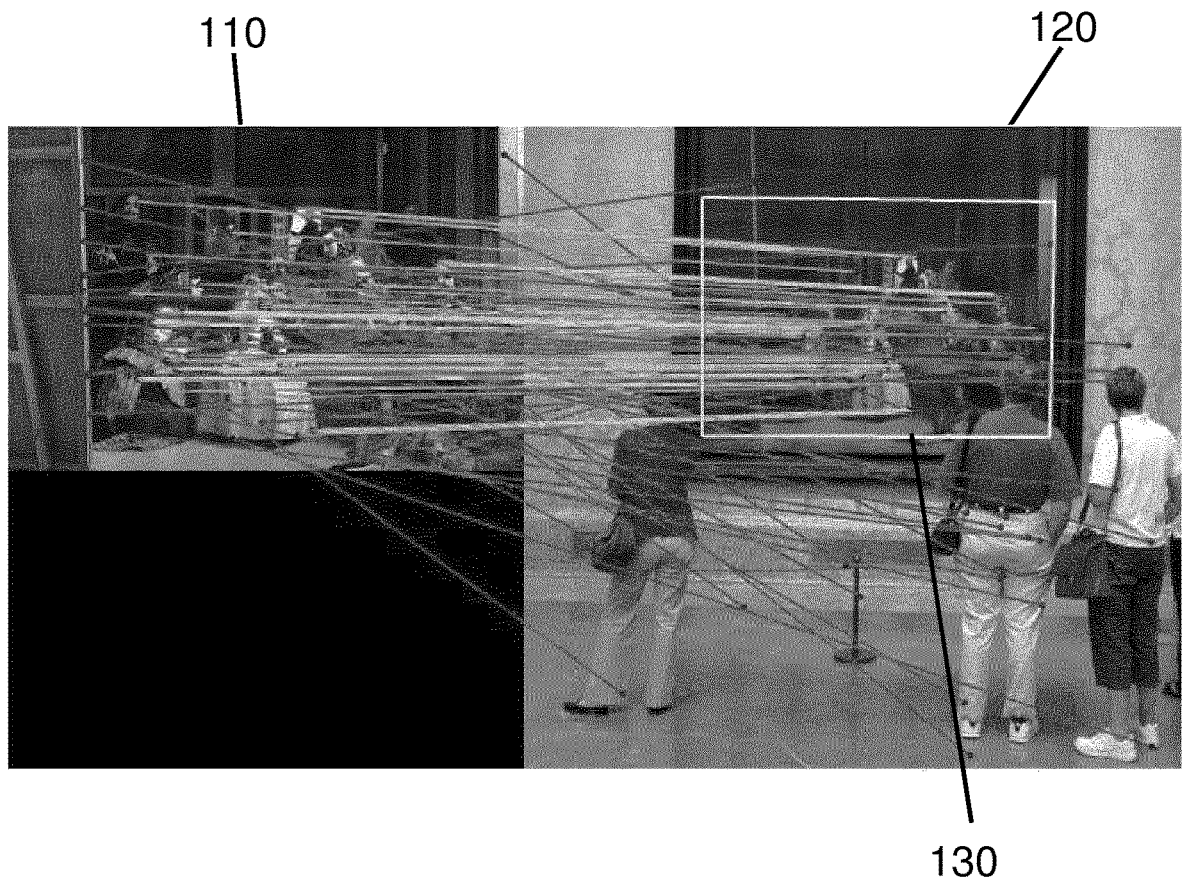
FIG. 1 depicts a (left) image used as reference in order to successfully localize a planar object in a query image (right) from a plurality of images in a database.
Figure 2:
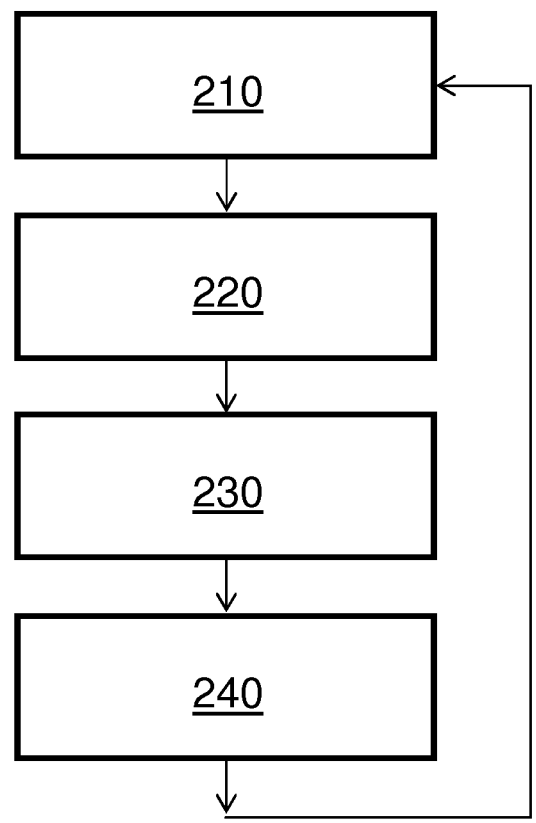
FIG. 2 depicts an object localization process.

Therefore the different aspects of the invention described enable localizing planar repetitive patterns in a time and resource efficient manner. As described, these different aspects are combinable, as they represent enhancement to different operational phases of the existing processing algorithm of FIG. 2. The embodiment of FIG. 4 represents the preferred implementation, however, several enhancements have been described which can be applied in addition to other ones to the embodiment of FIG. 4. For the sake of brevity, a flowchart figure has not been developed for each and every possible permutation of enhancements developed in the present disclosure.

In particular, the inventors have developed different aspects implemented as a method and device such as computing the homography between the model of the planar object and the query image even in cases of high repeatability, by using multiple views of the same object in order to deal with descriptors variability when the orientation of the object changes, selecting the most robust subset of local features using the set of multiple views training images, using all information available by allowing each model local feature to match with more than one feature in the query image, as well as the implementation of an adaptive radius threshold estimation procedure in order to find the multiple correspondences for each model local feature on the query image and geometric ranking for identifying the most probable inlier features, as well as weighting each correspondence with the probability of being a good match given a not far from correct homography between model reference image and the query image. Further enhancements have also been discussed regarding feature filtering, feature spreading, or descriptor filtering.

Furthermore, it is to be understood that the embodiments, realizations, and aspects described herein may be implemented by various means in hardware, software, firmware, middleware, microcode, or any combination thereof. Various aspects or features described herein may be implemented, on one hand, as a method or process or function, and on the other hand as an apparatus, a device, a system, or computer program accessible from any computer-readable device, carrier, or media. The methods or algorithms described may be embodied directly in hardware, in a software module executed by a processor, or a combination of the two.

The various means may comprise software modules residing in RAM memory, flash memory, ROM memory, EPROM memory, EEPROM memory, registers, hard disk, a removable disk, a CD-ROM, or any other form of storage medium known in the art.

The various means may comprise logical blocks, modules, and circuits may be implemented or performed with a general purpose processor, a digital signal processor (DSP), and application specific integrated circuit (ASIC), a field programmable gate array (FPGA), or other programmable logic device, discrete gate or transistor logic, discrete hardware components, or any combination thereof designed to perform the functions described. A general-purpose processor may be a microprocessor, but in the alternative, the processor may be any conventional processor, controller, microcontroller, or state machine.

The various means may comprise computer-readable media including, but not limited to, magnetic storage devices (for example, hard disk, floppy disk, magnetic strips, etc.), optical disks (for example, compact disk (CD), digital versatile disk (DVD), etc.), smart cards, and flash memory devices (for example, EPROM, card, stick, key drive, etc.). Additionally, various storage media described herein can represent one or more devices and/or other machine-readable media for storing information. The term machine-readable medium can include, without being limited to, various media capable of storing, containing, and/or carrying instruction(s) and/or data. Additionally, a computer program product may include a computer readable medium having one or more instructions or codes operable to cause a computer to perform the functions described herein.

What has been described above includes examples of one or more embodiments. It is, of course, not possible to describe every conceivable combination, or permutation, of components and/or methodologies for purposes of describing the aforementioned embodiments. However one of ordinary skill in the art will recognize that many further combinations and permutations of various embodiments are possible within the general inventive concept derivable from a direct and objective reading of the present disclosure. Accordingly, it is intended to embrace all such alterations, modifications and variations that fall within scope of the appended claims.

In the following, certain additional aspects or examples are described:

An apparatus for localizing planar objects in a query image, the apparatus comprising: means for detecting at least one feature in the query image; means for extracting at least one descriptor for each detected query image feature; means for matching at least one view of a reference image with the query image based on a comparison of their corresponding feature descriptors to determine a plurality of candidate correspondences; means for ranking the plurality of candidate correspondences based on a geometric distance criterion; and means for localizing the query image planar object as the planar object of the reference image view using the candidate correspondences with the highest rank.

The apparatus, wherein the detected feature is a local feature, such as a corner, border, window area, line, segment, high contrast region, or any other feature capable of being repetitively present in an image. The apparatus, wherein the at least one reference image view is obtained from a repository of reference image views stored together with previously detected reference features and previously extracted reference descriptors. The apparatus, wherein information about the location of the object in the query image is stored together with the query image. The apparatus, wherein the at least one reference image view is obtained from the repository of reference image views by selecting those reference image views with similar object location information as the query image object location information. The apparatus, wherein the means are configured to act iteratively on every pair of query image and reference image view, and wherein the means for localizing the query image planar object comprises means for determining a candidate homography for every pair and means for selecting the reference image view planar object corresponding to the best candidate homography as the query image planar object location. The apparatus, wherein the means for localizing comprises means for determining a plurality of candidate homographies based on a prior homography modified to take into account differences in scale and aspect ratio between the reference image view and the query image. The apparatus, wherein the means for localizing comprises means for determining a plurality of candidate homographies based on a prior homography between the reference image view and the current query image estimated from a previously processed query image in a video sequence. The apparatus, further comprising means for performing a local optimisation on the highest ranked homography using the set of inlier correspondences. The apparatus, wherein the means for ranking comprises means for assigning a geometric weight to each candidate correspondence according to the Euclidean distance of the reference feature candidate correspondences to the prior homography. The apparatus, further comprising means for selecting, from the plurality of query descriptors, a single query descriptor which complies with a relative adaptive radius criterion with respect to a reference descriptor. The apparatus, wherein the adaptive radius criterion is based on a ratio of the differences between descriptor distances of a reference descriptor to a first query descriptor and to a current query descriptor. The apparatus, wherein the means for detecting at least one feature comprises means for determining a feature repeatability score for each detected query feature at a particular resolution, means for accumulating the feature repeatability scores for a plurality of resolutions, and means for discarding the detected query features which have a cumulative feature repeatability score below a predetermined feature threshold. The apparatus, wherein the means for extracting at least one descriptor comprises means for determining a descriptor repeatability score for each extracted reference descriptor based on the number of times the extracted reference descriptor is matched to candidate reference descriptors in other similar views, means for accumulating the descriptor repeatability scores for the plurality of obtained reference image views, and means for sorting the extracted reference descriptor in terms of decreasing cumulative descriptor repeatability scores. The apparatus, further comprising means for spreading the extracted query descriptors all over the reference image view by dividing the reference image view in a number of N regions, one region defined around one corner of the quadrilateral over the planar object region of interest, and selecting an equivalent number of extracted query descriptors in each region.

A method of localizing planar objects in a query image, the method comprising: detecting at least one feature in the query image; extracting at least one descriptor for each detected query image feature; matching at least one view of a reference image with the query image based on a comparison of their corresponding feature descriptors to determine a plurality of candidate correspondences; ranking the plurality of candidate correspondences based on a geometric distance criterion; and localizing the query image planar object as the planar object of the reference image view preferably using the candidate correspondences with the highest rank.

The method, wherein the detected feature is a local feature, such as a corner, border, window area, line, segment, high contrast region, or any other feature capable of being repetitively present in an image. The method, wherein the at least one reference image view is obtained from a repository of reference image views stored together with previously detected reference features and previously extracted reference descriptors. The method, wherein information about the location of the object in the query image is stored together with the query image. The method, wherein the at least one reference image view is obtained from the repository of reference image views by selecting those reference image views with similar object location information as the query image object location information. The method, wherein the method is repeated iteratively for every pair of query image and reference image view, and wherein localizing the query image planar object comprises determining a candidate homography for every pair and selecting the reference image view planar object corresponding to the best candidate homography as the query image planar object location. The method, wherein localizing comprises determining a plurality of candidate homographies based on a prior homography modified to take into account differences in scale and aspect ratio between the reference image view and the query image. The method, wherein localizing comprises determining a plurality of candidate homographies based on a prior homography estimated from a previously processed query image in video between the reference image view and the current query image. The method, further comprising performing a local optimisation on the highest ranked homography using the set of inlier correspondences. The method, wherein the ranking is based on a geometric distance criterion comprises assigning a geometric weight to each candidate correspondence according to the Euclidean distance of the reference feature candidate correspondences to the candidate homography. The method, further comprising selecting, from the plurality of query descriptors, a single query descriptor which complies with a relative adaptive radius criterion with respect to a reference descriptor. The method, wherein the adaptive radius criterion is based on a ratio of the differences between descriptor distances of a reference descriptor to a first query descriptor and to a current query descriptor. The method, wherein detecting at least one feature comprises determining a feature repeatability score for each detected query feature at a particular resolution, accumulating the feature repeatability scores for a plurality of resolutions, and discarding the detected query features which have a cumulative feature repeatability score below a predetermined feature threshold.

The method, wherein extracting at least one descriptor comprises determining a descriptor repeatability score for each extracted query reference descriptor based on the number of times the extracted query reference descriptor is matched to candidate reference descriptors in other similar views, accumulating the descriptor repeatability scores for the plurality of obtained reference image views, and sorting the extracted query reference descriptor in terms of decreasing cumulative descriptor repeatability scores. The method, wherein the extracted query descriptors are spread all over the reference image view by dividing the reference image view in a number of N regions, one region defined around one corner of the quadrilateral over the planar object region of interest, and selecting an equivalent number of extracted query descriptors in each region.

A computer program comprising instructions, once executed on a processor, for performing the method steps. A computer readable medium comprising instructions, once executed on a processor, for performing the method steps.

A computer program comprising instructions, once executed on a processor, for performing the method steps of localizing planar objects in a query image, the method comprising: detecting at least one feature in the query image; extracting at least one descriptor for each detected query image feature; matching at least one view of a reference image with the query image based on a comparison of their corresponding feature descriptors to determine a plurality of candidate correspondences; ranking the plurality of candidate correspondences based on a geometric distance criterion; and localizing the query image planar object as the planar object of the reference image view preferably using the candidate correspondences with the highest rank.

The computer program, wherein the detected feature is a local feature, such as a corner, border, window area, line, segment, high contrast region, or any other feature capable of being repetitively present in an image. The method, wherein the at least one reference image view is obtained from a repository of reference image views stored together with previously detected reference features and previously extracted reference descriptors. The method, wherein information about the location of the object in the query image is stored together with the query image. The method, wherein the at least one reference image view is obtained from the repository of reference image views by selecting those reference image views with similar object location information as the query image object location information. The method, wherein the method is repeated iteratively for every pair of query image and reference image view, and wherein localizing the query image planar object comprises determining a candidate homography for every pair and selecting the reference image view planar object corresponding to the best candidate homography as the query image planar object location. The method, wherein localizing comprises determining a plurality of candidate homographies based on a prior homography modified to take into account differences in scale and aspect ratio between the reference image view and the query image. The method, wherein localizing comprises determining a plurality of candidate homographies based on a prior homography estimated from a previously processed query image in video between the reference image view and the current query image. The method, further comprising performing a local optimisation on the highest ranked homography using the set of inlier correspondences. The method, wherein the ranking is based on a geometric distance criterion comprises assigning a geometric weight to each candidate correspondence according to the Euclidean distance of the reference feature candidate correspondences to the candidate homography. The method, further comprising selecting, from the plurality of query descriptors, a single query descriptor which complies with a relative adaptive radius criterion with respect to a reference descriptor. The method, wherein the adaptive radius criterion is based on a ratio of the differences between descriptor distances of a reference descriptor to a first query descriptor and to a current query descriptor. The method, wherein detecting at least one feature comprises determining a feature repeatability score for each detected query feature at a particular resolution, accumulating the feature repeatability scores for a plurality of resolutions, and discarding the detected query features which have a cumulative feature repeatability score below a predetermined feature threshold. The method, wherein extracting at least one descriptor comprises determining a descriptor repeatability score for each extracted query reference descriptor based on the number of times the extracted query reference descriptor is matched to candidate reference descriptors in other similar views, accumulating the descriptor repeatability scores for the plurality of obtained reference image views, and sorting the extracted query reference descriptor in terms of decreasing cumulative descriptor repeatability scores. The method, wherein the extracted query descriptors are spread all over the reference image view by dividing the reference image view in a number of N regions, one region defined around one corner of the quadrilateral over the planar object region of interest, and selecting an equivalent number of extracted query descriptors in each region.

A non-transitory computer readable medium comprising instructions, once executed on a processor, for performing the method steps of localizing planar objects in a query image, the method comprising: detecting at least one feature in the query image; extracting at least one descriptor for each detected query image feature; matching at least one view of a reference image with the query image based on a comparison of their corresponding feature descriptors to determine a plurality of candidate correspondences; ranking the plurality of candidate correspondences based on a geometric distance criterion; and localizing the query image planar object as the planar object of the reference image view preferably using the candidate correspondences with the highest rank.

The non-transitory computer readable medium, wherein the detected feature is a local feature, such as a corner, border, window area, line, segment, high contrast region, or any other feature capable of being repetitively present in an image. The method, wherein the at least one reference image view is obtained from a repository of reference image views stored together with previously detected reference features and previously extracted reference descriptors. The method, wherein information about the location of the object in the query image is stored together with the query image. The method, wherein the at least one reference image view is obtained from the repository of reference image views by selecting those reference image views with similar object location information as the query image object location information. The method, wherein the method is repeated iteratively for every pair of query image and reference image view, and wherein localizing the query image planar object comprises determining a candidate homography for every pair and selecting the reference image view planar object corresponding to the best candidate homography as the query image planar object location. The method, wherein localizing comprises determining a plurality of candidate homographies based on a prior homography modified to take into account differences in scale and aspect ratio between the reference image view and the query image. The method, wherein localizing comprises determining a plurality of candidate homographies based on a prior homography estimated from a previously processed query image in video between the reference image view and the current query image. The method, further comprising performing a local optimisation on the highest ranked homography using the set of inlier correspondences. The method, wherein the ranking is based on a geometric distance criterion comprises assigning a geometric weight to each candidate correspondence according to the Euclidean distance of the reference feature candidate correspondences to the candidate homography. The method, further comprising selecting, from the plurality of query descriptors, a single query descriptor which complies with a relative adaptive radius criterion with respect to a reference descriptor. The method, wherein the adaptive radius criterion is based on a ratio of the differences between descriptor distances of a reference descriptor to a first query descriptor and to a current query descriptor. The method, wherein detecting at least one feature comprises determining a feature repeatability score for each detected query feature at a particular resolution, accumulating the feature repeatability scores for a plurality of resolutions, and discarding the detected query features which have a cumulative feature repeatability score below a predetermined feature threshold. The method, wherein extracting at least one descriptor comprises determining a descriptor repeatability score for each extracted query reference descriptor based on the number of times the extracted query reference descriptor is matched to candidate reference descriptors in other similar views, accumulating the descriptor repeatability scores for the plurality of obtained reference image views, and sorting the extracted query reference descriptor in terms of decreasing cumulative descriptor repeatability scores. The method, wherein the extracted query descriptors are spread all over the reference image view by dividing the reference image view in a number of N regions, one region defined around one corner of the quadrilateral over the planar object region of interest, and selecting an equivalent number of extracted query descriptors in each region.

The invention claimed is:

1. An apparatus for localizing planar objects in a query image, the apparatus comprising:
   means for detecting a plurality of features in the query image;
   means for extracting at least one descriptor for each detected query image feature;
   means for generating an at least one query-reference image pair by matching each feature of at least one view of a reference image with the plurality of query image features based on a comparison of their corresponding feature descriptors to determine a plurality of candidate descriptor correspondences for each reference image feature;
   for each query-reference image pair, means for ranking the plurality of candidate descriptor correspondences based on a prior homography;
   means for localizing the query image planar object as the planar object of the reference image view corresponding to the candidate descriptor correspondences with the highest rank;
      wherein the detected feature is a local feature, such as a corner, border, window area, line, segment, high contrast region, or any other feature capable of being repetitively present in an image, and wherein the at least one reference image view is obtained from a repository of reference image views stored together with previously detected reference features and previously extracted reference descriptors; and
   wherein the means for localizing the query image planar object comprises means for determining a candidate homography for each query-reference image pair and means for selecting the reference image view planar object corresponding to the best candidate homography as the query image planar object location.

2. The apparatus of claim 1, wherein the means for localizing comprises means for determining a plurality of candidate homographies based on a prior homography, the prior homography being the identity homography modified to take into account differences in scale and aspect ratio between the reference image view and the query image.

3. The apparatus of claim 1, wherein the means for localizing comprises means for determining a plurality of candidate homographies based on a prior homography between the reference image view and the current query image estimated from a previously processed query image in a video sequence.

4. The apparatus of claim 1, further comprising means for performing a local optimisation on the highest ranked homography using the set of inlier correspondences, wherein the means for ranking comprises means for assigning a geometric weight to each candidate correspondence according to the Euclidean distance of the reference feature candidate correspondences to the prior homography.

5. The apparatus of claim 1, further comprising means for selecting, from the plurality of query descriptors, a single query descriptor which complies with a relative adaptive radius criterion with respect to a reference descriptor, wherein the adaptive radius criterion is based on a ratio of the differences between descriptor distances of a reference descriptor to a first query descriptor and to a current query descriptor.

6. The apparatus of claim 1, wherein the means for detecting at least one feature comprises means for determining a feature repeatability score for each detected reference feature at a particular resolution, means for accumulating the feature repeatability scores for a plurality of reduced resolutions, and means for discarding the detected reference features which have a cumulative feature repeatability score below a predetermined feature threshold.

7. The apparatus of claim 1, wherein the means for extracting at least one descriptor comprises means for determining a descriptor repeatability score for each extracted reference descriptor based on the number of times the extracted reference descriptor is matched to candidate reference descriptors in other views, means for accumulating the descriptor repeatability scores for the plurality of obtained reference image views, and means for sorting the extracted reference descriptor in terms of decreasing cumulative descriptor repeatability scores.

8. The apparatus of claim 7, further comprising means for spreading the extracted reference descriptors all over the reference image view by dividing the reference image view in a number of N regions, one region defined around one corner of the area of the planar object to be localized, and selecting an equivalent number of extracted reference descriptors in each region.

9. A method of localizing planar objects in a query image, the method comprising the steps of, using an at least one hardware processor:
   detecting, via the at least one processor, a plurality of features in the query image;

extracting, via the at least one processor, at least one descriptor for each detected query image feature;

generating, via the at least one processor, an at least one query-reference image pair by matching each feature of at least one view of a reference image with the plurality of query image features based on a comparison of their corresponding feature descriptors to determine a plurality of candidate descriptor correspondences for each reference image feature;

for each query-reference image pair, ranking, via the at least one processor, the plurality of candidate descriptor correspondences based on a prior homography; and localizing, via the at least one processor, the query image planar object as the planar object of the reference image view corresponding to the candidate descriptor correspondences with the highest rank;

wherein the detected feature is a local feature, such as a corner, border, window area, line, segment, high contrast region, or any other feature capable of being repetitively present in an image, and wherein the at least one reference image view is obtained from a repository of reference image views stored together with previously detected reference features and previously extracted reference descriptors; and wherein localizing the query image planar object comprises determining a candidate homography for each query-reference image pair and selecting the reference image view planar object corresponding to the best candidate homography as the query image planar object location.

10. The method of claim 9, wherein localizing comprises determining a plurality of candidate homographies based on a prior homography, the prior homography being the identity homography modified to take into account differences in scale and aspect ratio between the reference image view and the query image.

11. The method of claim 9, wherein localizing comprises determining a plurality of candidate homographies based on a prior homography estimated from a previously processed query image in video between the reference image view and the current query image.

12. The method of claim 9, further comprising performing a local optimisation on the highest ranked homography using the set of inlier correspondences, wherein the ranking is based on a geometric distance criterion comprises assigning a geometric weight to each candidate correspondence according to the Euclidean distance of the reference feature candidate correspondences to the candidate homography.

13. The method of claim 9, further comprising selecting, from the plurality of query descriptors, a single query descriptor which complies with a relative adaptive radius criterion with respect to a reference descriptor, wherein the adaptive radius criterion is based on a ratio of the differences between descriptor distances of a reference descriptor to a first query descriptor and to a current query descriptor.

14. The method of claim 9, wherein detecting at least one feature comprises determining a feature repeatability score for each detected reference feature at a particular resolution, accumulating the feature repeatability scores for a plurality of reduced resolutions, and discarding the detected reference features which have a cumulative feature repeatability score below a predetermined feature threshold.

15. The method of claim 9, wherein extracting at least one descriptor comprises determining a descriptor repeatability score for each extracted reference descriptor based on the number of times the extracted reference descriptor is matched to candidate reference descriptors in other views, accumulating the descriptor repeatability scores for the plurality of obtained reference image views, and sorting the extracted reference descriptor in terms of decreasing cumulative descriptor repeatability scores, and wherein the extracted reference descriptors are spread all over the reference image view by dividing the reference image view in a number of N regions, one region defined around one corner of the area of the planar object to be localized, and selecting an equivalent number of extracted reference descriptors in each region.

16. A non-transitory computer readable medium containing program instructions for causing a processor to perform the method steps of:

detecting a plurality of features in the query image;

extracting at least one descriptor for each detected query image feature;

generating an at least one query-reference image pair by matching each feature of at least one view of a reference image with the plurality of query image features based on a comparison of their corresponding feature descriptors to determine a plurality of candidate descriptor correspondences for each reference image feature;

for each query-reference image pair, ranking the plurality of candidate descriptor correspondences based on a prior homography; and localizing the query image planar object as the planar object of the reference image view corresponding to the candidate descriptor correspondences with the highest rank;

wherein the detected feature is a local feature, such as a corner, border, window area, line, segment, high contrast region, or any other feature capable of being repetitively present in an image, and wherein the at least one reference image view is obtained from a repository of reference image views stored together with previously detected reference features and previously extracted reference descriptors; and wherein localizing the query image planar object comprises determining a candidate homography for each query-reference image pair and selecting the reference image view planar object corresponding to the best candidate homography as the query image planar object location.

17. A non-transitory computer readable medium comprising instructions, once executed on a processor, for performing the method steps of:

detecting a plurality of features in the query image;

extracting at least one descriptor for each detected query image feature;

generating an at least one query-reference image pair by matching each feature of at least one view of a reference image with the plurality of query image features based on a comparison of their corresponding feature descriptors to determine a plurality of candidate descriptor correspondences for each reference image feature;

for each query-reference image pair, ranking the plurality of candidate descriptor correspondences based on a prior homography; and localizing the query image planar object as the planar object of the reference image view corresponding to the candidate descriptor correspondences with the highest rank;

wherein the detected feature is a local feature, such as a corner, border, window area, line, segment, high contrast region, or any other feature capable of being repetitively present in an image, and wherein the at least one reference image view is obtained from a repository of reference image views stored together with previously detected reference features and previously extracted reference descriptors; and wherein localizing the query image planar object comprises determining a candidate homography for each query-reference image pair and selecting the reference image view planar object corresponding to the best candidate homography as the query image planar object location.

* * * * *